Dec. 3, 1968   J. R. PARRISH   3,414,665
SPEED CHANGING MECHANISM
Filed June 30, 1966   2 Sheets-Sheet 1

INVENTOR
JOSEPH REGINALD PARRISH
BY
Shoemaker and Mattare
ATTORNEYS

Dec. 3, 1968  J. R. PARRISH  3,414,665
SPEED CHANGING MECHANISM
Filed June 30, 1966  2 Sheets-Sheet 2

INVENTOR
Joseph Reginald Parrish
BY
Shoemaker and Mattare
ATTORNEYS

United States Patent Office 3,414,665
Patented Dec. 3, 1968

3,414,665
SPEED CHANGING MECHANISM
Joseph Reginald Parrish, Richmond, Surrey, England, assignor to Parrish Instruments Limited, Richmond, Surrey, England, a British company
Filed June 30, 1966, Ser. No. 561,966
1 Claim. (Cl. 74—193)

ABSTRACT OF THE DISCLOSURE

The speed changing device includes a housing in which spaced oppositely inclined driving and driven cones are mounted on spaced parallel rotatable shafts respectively. The rotary movement of the driving cone is transmitted to the driven cone by a pair of balls mounted in a cage between said cones and movable longitudinally thereof. Ball race bearings having inner and outer cages positioned at opposite ends of the cones, support the shafts. Sleeves on the shaft maintain the ends of the cones in spaced relation to the inner cage of the bearing. A plug surrounding each shaft adjacent the large end of each cone is threaded into the housing and is adjustable to exert thrust on the outer cage of the ball race in a direction axially toward the adjacent cone thereby urging said cones toward one another and pressing the cones in wedging fashion against said pair of balls.

---

Figure 1:
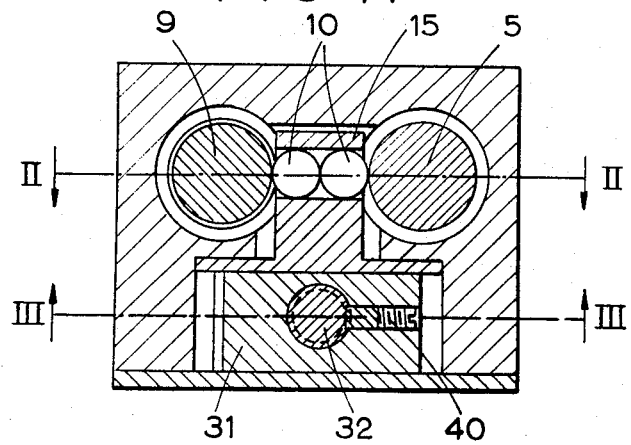

This invention relates to speed changing mechanism and more particularly to mechanism of the friction type having opposing cones or frusto-cones hereafter referred to as cones, rotary movement of the driving cone being transmitted to the driven cone by an intermediate member or members. One of the cones may have an infinitely small cone angle, i.e., it is a cylinder.

Such mechanisms are well known and usually comprise a pair of cones, each mounted on a shaft, the cone being oppositely inclined. In order that the intermediate member may operate between parallel surfaces the cone pairs may have the same cone angle and the shafts may be parallel. Variation in the speed of rotation of the driving cone relative to the driven cone is obtained by shifting the intermediate member so that it bears against a larger or smaller part of the cones. Thus to increase the speed of the rotation of the driven cone relative to the driving cone the intermediate member is shifted in one direction to bear against a larger part of the driving cone and a smaller part of the driven cone. To lower the relative speed or rotation of the driven cone the intermediate member is moved in the opposite direction.

The intermediate member comprises a pair of balls mounted in a cage and adapted to bear against one another, one of the balls bearing also against the driving cone while the other ball bears against the driven cone.

The cage is moved to vary the position at which the balls bear on the cones, this movement being parallel to the inclination of the cones at the points where the balls bear, and being the same plane as the axes of the shafts carrying the cones.

The cage carrying the balls is mounted to slide in a slot formed for the purpose in a housing for the mechanism, this slot being disposed in a direction parallel to that in which the cage is required to move.

Preferably the cage is slidably connected to a bar which is engaged by a worm threaded screw, the arrangement being such that rotation of the screw causes movement of the bar, this in turn causing movement of the cage in the slot. Thus rotation of the screw varies the position at which the balls bear on the cones, and the arrangement provides an infinitely variable speed changing mechanism limited only by the relative sizes of the cones, the rate of variation being dependent on the inclination of the cones and on the pitch of the thread of the worm screw. The thread of the worm screw may be constant in which case the relationship between the rotation of the output shaft and the position of cage for a constant velocity of the input shaft follows an inverse law. In order to linearise this relationship either the output cone may have a zero cone angle, i.e., it is a cylinder, or the helix angle of the leadscrew may change continuously throughout its length.

A mechanism such as is described above will be referred to hereinafter for the sake of convenience as a speed changing device of the kind specified.

One of the problems associated with a speed changing device of the kind specified is that of maintaining contact between the cones and the balls of the intermediate member and the invention has for its object to provide improvements in this respect.

Figure 2:
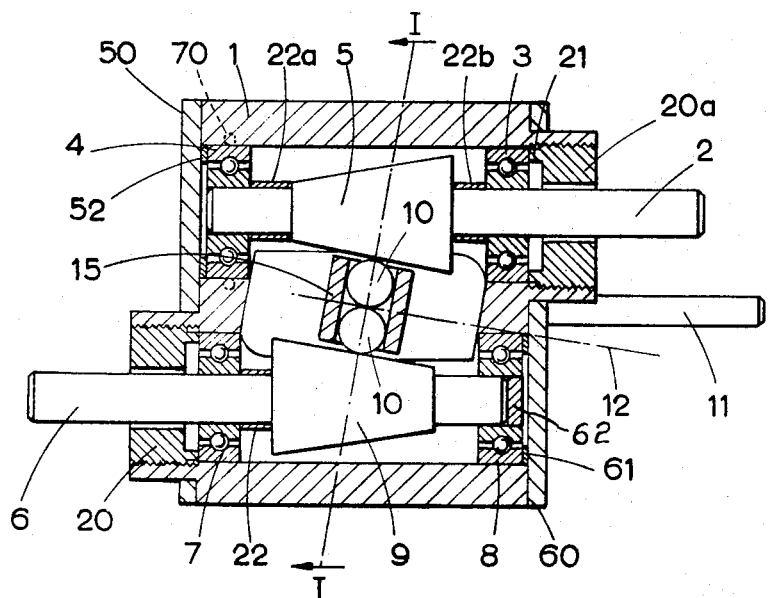
Figure 3:
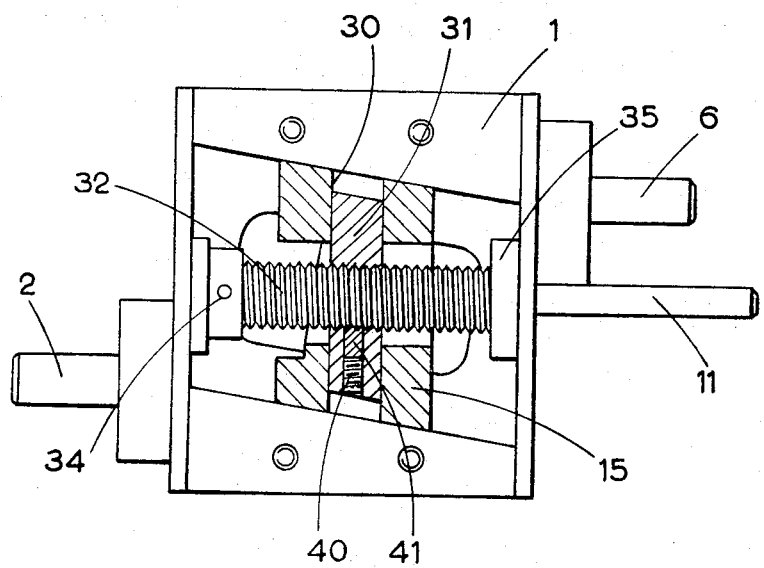

One embodiment of the invention is illustrated by way of example in the accompanying drawings, in which:

FIGURE 1 is a transverse cross-sectional view of a speed changing device taken on the lines I—I of FIGURE 2, FIGURE 2 is a cross-sectional view taken on the lines II—II of FIGURE 1, and FIGURE 3 is a cross-sectional view taken on the lines III—III of FIGURE 1.

In the drawings, 1 generally represents a housing for the mechanism, while 2 is an input shaft supported in the housing by ball races 3 and 4 respectively, while 5 is a cone carried on the shaft 2. 6 is an output shaft supported by ball races 7 and 8 and carrying a cone 9. The shafts 2 and 6 are parallel to one another, while the cones 5 and 9 are oppositely inclined and are fixed against rotation relative to their respective shafts. The cones may be integral with the shafts.

A pair of bearing balls 10 are disposed in the same plane as the axes of the shafts 2 and 6 between the cones 5 and 9, the balls bearing against one another and one of the balls bearing against the cone 5, while the other ball bears against the cone 9. The bearing balls are carried in a cage 15 which is mounted for sliding movement in either direction indicated by the dotted line 12 (in FIGURE 2), said direction being parallel to the inclination of the cones at the points where the balls bear. Rotation of a shaft 11 (in threaded engagement with the cage 15) is arranged to effect movement of the cage 15 with its balls 10 in either direction indicated by the dotted line 12.

Referring now to FIGURES 1 and 3 it will be seen that the lower part of cage 15 is a tight but sliding fit between parallel walls 16 of the housing 1, which walls together define a slot along which the cage may be guided for movement in the direction of dotted line 12 (FIGURE 2).

The cage 15 defines a slot 30 in which a bar 31 is a tight sliding fit. The shaft 11 has a leadscrew portion 32, supported for rotation in bearings 34 and 35, and in threaded engagement with an aperture in the bar 31. Rotation of the shaft 11 in one direction will cause movement of the bar 31 to the left in FIGURES 2 and 3 while rotation of the shaft 11 in the opposite direction of rotation will cause movement of the bar 31 to the right in FIGURES 2 and 3.

Such movement of the bar 31 will be communicated to the cage 15 to cause movement of the latter along the slot defined by the walls 16 and this in turn will alter the position at which the balls 10 bear on the cones 5 and 9.

It will be appreciated that where the balls 10 each bear on parts of the cones 5 and 9 which are identical in size, one revolution of the driving cone 5 will produce one revolution of the driven cone 9; whereas if the cage is shifted towards the right in FIGURE 2, one revolution of the driving cone 5 will produce progressively more than one revolution of the driven cone 9, while movement of the cage 15 towards the left in FIGURE 2 will progressively lower the rate of transmission.

In FIGURES 1 and 3, 40 represents a screw which may be tightened to cause a plug 41 to bear on the lead screw portion 32 of the shaft 11 to prevent backlash.

With a speed changing device of the kind so far described with reference to the drawings, it is important that the balls 10 are maintained in contact with the cones. According to the present invention this is achieved by preloading the shaft 6 in a special manner, so as to urge it to the right, in FIGURE 2, during assembly of the device as will now be explained with reference to FIGURE 2.

When the lead screw and cage 15 have been placed in position, end plate 50 is secured to housing 1. Ball bearing assembly 4 is arranged spaced from plate 50 by a ring 51 which supports the outer cage of the ballrace. Shaft 2 is then inserted with sleeves 22a and 22b followed by ball bearing assembly 3. A plug 20a is then screwed home until it bears firmly against the outer cage of the ball race of assembly 3.

The end cover 60 is then placed in position together with ball bearing assembly 8 and a ring 61 which supports the outer cage of the ball race in spaced relationship from the end plate 60.

The balls 10 having been inserted in cage 15 and the shaft 6 located within the inner cage of bearing 8, a spacer sleeve 22 is positioned on the shaft followed by bearing assembly 7.

A plug 20 is then screwed home in housing 1 bearing against the outer cage of the ball bearing assembly 7. The thrust is transmitted through the balls of the ball race to the inner cage thereof and thence via the sleeve 22 to the cone 10 which in turn is urged into firm engagement with the ball 10. The plug 20 is tightened sufficiently to ensure firm contact of the balls 10 with one another and with the cones against which they bear respectively.

Finally, the end plate 60 is temporarily removed and a buffer plug 62 of nylon is inserted to occupy the space between the end of shaft 6 and plate 60 which is then replaced.

Lack of precision in the system, that is to say nonparallelism of the cone axes, irregularities of the cone surfaces, discrepancies of the cone angles and other dissimiliarities between the cones will be compensated for by resilience of the mechanism as a whole, for example by flexure of the cone shafts and the small degree of resilience afforded by the shaft bearings. Notwithstanding this, it is to be understood that the thrust exerted when the plug 20 is screwed home causes a direct mechanical thrust axially on the cone 9. This in practice effects considerably improved contact between the balls and cones as compared with the case if such axial thrust were resiliently exerted. It will be seen that the thrust exerted by the plug 20 is eventually transmitted to the plug 20a with no intervening member which affords any appreciable resilience.

However, it has been found that in some cases there is a tendency for slip to occur more at one end of the span of movement of the cage than at the other, that is to say, the slip torque or the loading condition under which slip will occur, will increase between one end of the travel of the cage and the other. Where this tendency is found it can be overcome according to a further aspect of the invention, by providing resilient radial preloading of the shaft carrying the cone whose smaller end is engaging the balls when maximum slip occurs. Such preloading of the shaft is effected at its bearing adjacent the said small end of the cone, preferably by interposing a resilient member, for example an O-ring between the bearing and its housing in the framework of the mechanism, with such preloading being effective to urge the cone to bear harder on its associated ball.

Such an O-ring is indicated in dotted lines at 70 in FIGURE 2.

I claim:

1. A speed changing device of the kind hereinbefore referred to having opposing cones in which rotary movement of a driving cone is transmitted to a driven cone by an intermediate member comprising a cage mounting a pair of balls arranged to bear against one another in said cage, one of the balls bearing also against the driving cone while the other ball bears also against the driven cone, said cones each having a shaft, ball race bearing assemblies at the opposite ends of each of said cones and supporting said shafts for rotation in a housing of the device, said rotation being about the axis of each of said cones, and in the case of at least one of said cones, means for preloading the said cone axially so as to press the said cone in wedge fashion against its associated ball in said intermediate member, said means being arranged to urge the bearing assembly which supports the said cone for rotation, in a direction axially towards said cone, said bearing assembly which is urged axially towards its associated cone being adjacent the larger end of the said cone, said bearing comprising a ball race and inner and outer cages, the inner cage surrounding the shaft associated with the cone and there being a sleeve on said shaft serving to maintain a spaced relationship between the inner cage and the larger end of the said cone and including a plug surrounding the shaft and screw-threaded into the housing of the device and which, on being screwed home, exerts thrust on the outer cage of said ball race in a direction axially towards said cone.

References Cited

UNITED STATES PATENTS

| 1,176,550 | 3/1916 | Haywood | 74—193 |
| 2,865,213 | 12/1958 | Pernollet et al. | 74—193 |

FOREIGN PATENTS 992,039   5/1965   Great Britain.

C. J. HUSAR, *Primary Examiner.*